2,891,037
Patented June 16, 1959

2,891,037

COPOLYMERS OF ALLYL ALCOHOL

Raymond H. Reinhard, Galveston, Tex., assignor to Monsanto Chemical Company, St. Louis, Mo., a corporation of Delaware No Drawing. Application December 26, 1956
Serial No. 630,441

1 Claim. (Cl. 260—67)

This invention relates to the production of new polymeric materials having valuable and characteristic properties that make them especially useful in producing synthetic materials useful in the plastics and coating arts. More particularly, the present invention pertains to hydroxyl-containing polymeric compositions of matter prepared by polymerizing acrolein or methacrolein with allyl alcohol and methallyl alcohol.

Allyl and methallyl alcohol do not homopolymerize readily and usually give polymers with a lower molecular weight than those obtained from corresponding vinyl compounds. They are also somewhat difficult to copolymerize with other unsaturated materials. However, it has now been discovered that these alcohols can be readily copolymerized with unsaturated aldehydes such as acrolein and methacrolein to yield valuable polymeric materials which are useful in the production of films, fibers, molding compositions, coating compositions, and the like.

According to the invention, acrolein-allyl alcohol copolymers are prepared by polymerizing, in the presence of a polymerization catalyst, specifically, a free-radical-generating catalyst, a mixture of acrolein and allyl alcohol, said mixture containing from 20 to 80 parts by weight (and preferably from 30 to 50 parts) of allyl alcohol and from 80 to 20 parts by weight (more particularly from 70 to 50 parts) of acrolein.

The invention may be best understood from a consideration of the following examples which are presented for illustrative purposes only and are not to be construed as limiting it in any manner.

Example I

A mixture of 30 parts of acrolein, 70 parts of allyl alcohol, and an amount of ditertiary butyl peroxide catalyst representing 4% by weight of these two monomers was charged to a ¾-in. stainless steel tubular reactor 24 inches long. The tube was sealed by means of a ¾-in. N.P.T. stainless steel union located 6 in. from the end of the reactor. The reactor was immersed in a constant-temperature oil bath maintained at 150° C. for a period of about one hour. At the end of that time, the reactor was removed and cooled and its contents were discharged into a 300-ml. flask. Unreacted monomers were removed by heating the reaction mixture at reduced pressure. The molten polymer was then heated to 170° C. at 200 mm. of Hg to free it from any remaining volatile material. It was then cooled to room temperature and the hardened solid polymer was removed by breaking the flask and separating it from the glass. The copolymer obtained (101 g.—50% conversion) was a yellow brittle solid having a hydroxyl content of 10.8%.

This copolymer is particularly useful in the preparation of baked-enamel-type coatings. A portion of the polymer was dissolved in n-butanol to form a clear solution. This was cast on a 10-mil coke-steel tinned plate and allowed to dry in air for about 20 min. Thereafter, it was "set" by baking at 150° C. for 20 minutes. The cured film was clear, hard, glossy, resistant to aliphatic and aromatic hydrocarbon solvents such as hexane and benzene, and exhibited good adhesion to the metal.

Example II

Following the procedure given in Example I and using the same conditions with the exception of a contact time of 30 min., a copolymer having an hydroxyl content of 11.3% was prepared from a charge consisting of 80 parts of allyl alcohol, 20 parts of acrolein, and about 4% by weight of these monomers of ditertiary butyl peroxide catalyst.

Example III

The polymerization charge in this run consisted of 50 parts of allyl alcohol and 50 parts of acrolein and 1% by weight of the monomers of ditertiary butyl peroxide. Polymerization was effected by the same procedure described in Example I. Upon isolation of the copolymer in this instance, it was observed that it existed as a gel probably as a result of crosslinking via hemiacetal formation between polymer chains. The gel was readily broken up, however, by heating the copolymer with n-butanol for a short period of time. Dissolution of the gel was accelerated if a pellet of KOH was dissolved in the n-butanol before the polymer was added. The gelled copolymer is advantageous from the standpoint of practical use. A solution of the gel can be painted on an object to be coated, the object can then be baked in an oven to remove the solvent and a gelled polymer coating remains.

The conditions under which the copolymers of the invention may be produced may be varied over fairly wide ranges. The charge mixture of comonomers consisting of allyl alcohol and acrolein may contain the monomers in a weight ratio of from about 20 to about 80 parts of allyl alcohol to 80 to 20 parts of acrolein. Preferably, from about 30 to about 50 parts of allyl alcohol with from about 70 to about 50 parts of acrolein are employed in the polymerization mixture.

While it may be possible at sufficiently elevated temperatures to induce the copolymerization without a catalyst, a free-radical generating polymerization catalyst is ordinarily employed. In addition to the ditertiary-butyl peroxide catalyst mentioned in the examples given, other peroxides are suitable, for example, acyl peroxides such as t-butyl perbenzoate; hydrocarbon peroxides such as diethyl peroxide, cumene hydroperoxide, p-cymene hydroperoxide, and the like; and inorganic per-compounds such as hydrogen peroxide. The amount of catalyst required is in the range from about 1% to about 10% by weight of the monomer mixture. Preferably, the quantity of catalyst employed is kept within the range from about 3 to about 6%.

The mixture of monomers may be polymerized at temperatures from about 100° C. to about 300° C. but preferred temperatures lie in the range from about 150° C. to about 220° C. The examples show polymerization at autogenous pressure at a given temperature and this is the preferred method. However, the polymerization may be conducted at elevated pressures if desired.

Contact time or polymerization time in the reaction depends upon the conversion desired under the chosen conditions. Under the preferred conditions of temperature and pressure indicated, a contact time of 30 minutes to 90 minutes will normally give satisfactory conversions.

It is to be noted also that while the examples are directed to copolymers of allyl alcohol and acrolein specifically, that methacrolein and methallyl alcohol are equally suitable. Thus copolymers of methacrolein and allyl alcohol and of acrolein and methallyl alcohol are also contemplated as coming within the scope of the invention.

What is claimed is:

A composition of matter comprising the product of polymerization at a temperature within the range from about 100° C. to about 200° C. in the presence of a free-radical-generating catalyst of a mixture of comonomers consisting of 30 parts by weight of acrolein and 70 parts by weight of allyl alcohol.

References Cited in the file of this patent

UNITED STATES PATENTS 2,657,192   Miller et al. _____ Oct. 27, 1953

FOREIGN PATENTS 841,505   Germany _____ June 16, 1952